J. P. TARBOX.
CONVERTIBLE MULTIPLANE.
APPLICATION FILED APR. 5, 1918.

1,336,406.

Patented Apr. 6, 1920.
3 SHEETS—SHEET 1.

INVENTOR.
John P. Tarbox

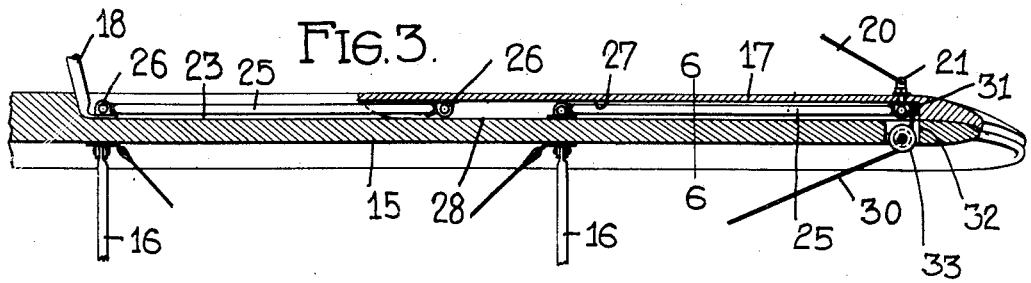
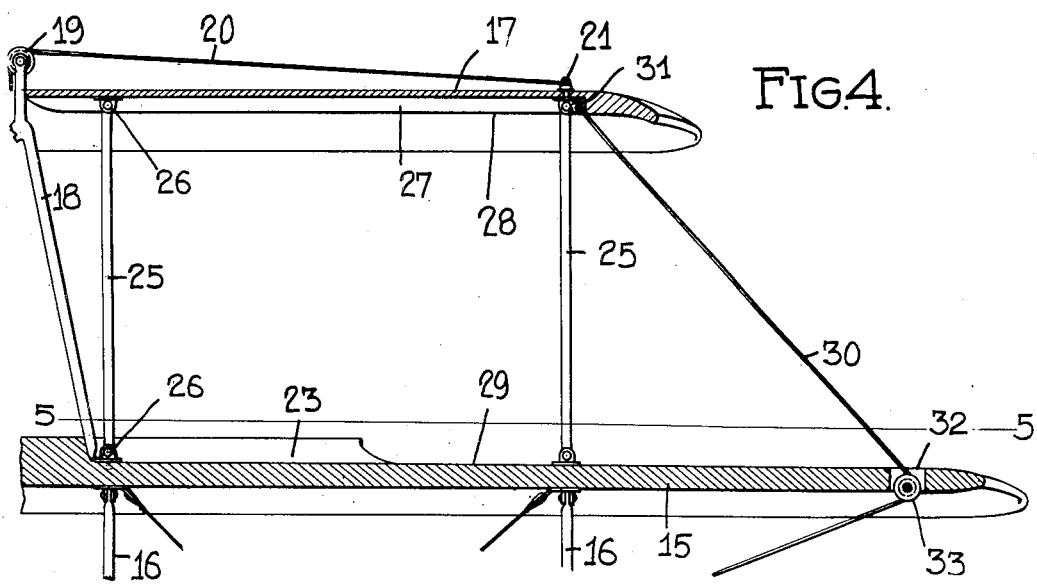
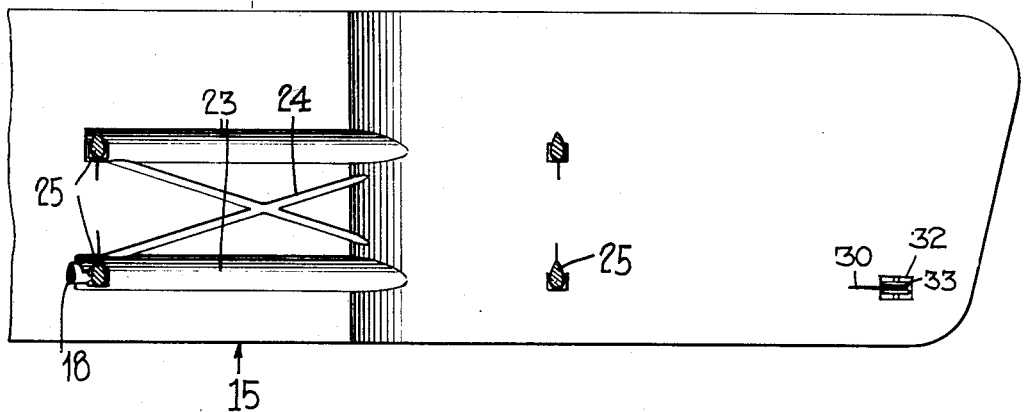

J. P. TARBOX.
CONVERTIBLE MULTIPLANE.
APPLICATION FILED APR. 5, 1918.

1,336,406.

Patented Apr. 6, 1920.
3 SHEETS—SHEET 3.

INVENTOR
John P. Tarbox.

UNITED STATES PATENT OFFICE.

JOHN P. TARBOX, OF GARDEN CITY, NEW YORK, ASSIGNOR TO CURTISS AEROPLANE AND MOTOR CORPORATION, A CORPORATION OF NEW YORK.

CONVERTIBLE MULTIPLANE.

1,336,406.   Specification of Letters Patent.   Patented Apr. 6, 1920.

Application filed April 5, 1918. Serial No. 226,843.

*To all whom it may concern:*

Be it known that I, JOHN P. TARBOX, a citizen of the United States, residing at Garden City, in the county of Nassau and State of New York, have invented certain new and useful Improvements in Convertible Multiplanes, of which the following is a specification.

This invention relates to aircraft and has reference more particularly to aeroplanes. Craft of the aeroplane type are characterized by one or more supporting surfaces having an angle of incidence varying, usually, from one to ten degrees. Machines equipped with supporting surfaces having an angle of incidence in excess of three degrees, although capable of carrying considerable load, present to the atmosphere a very large area directly resisting flight. This drag or head resistance increases proportionately as the angle of incidence is increased. In other words, the angle of incidence (within certain limits) determines the lifting efficiency incident to flight. Both lifting and climbing efficiency, however, under existing conditions, can only be obtained at a sacrifice of speed and cruising radius considering power and fuel capacity unchanged.

Bearing in mind the foregoing deficiencies, it is an object of the present invention to increase the lifting and climbing efficiency of high speed machines without altering the angle of incidence of the supporting surfaces. After gaining flight it is proposed to decrease (if desired) the lifting and climbing efficiency and in so doing decrease the head resistance to secure maximum speed. This desideratum is effected by means of auxiliary supporting surfaces arranged for movement into and out of contiguous pocketed contact with the fixed surfaces of the craft. Normally these auxiliary surfaces snugly engage with said fixed surfaces in such a manner as to offer but little if any increased resistance to flight. In climbing, however, (when emergency necessitates a rapid climb) and in alighting and starting (for obvious reasons) the auxiliary surfaces are removed to positions above (or below) the main supporting surface to act therewith in sustaining the craft in the air. By increasing the useful area of the supporting surfaces, the climbing and lifting efficiency are increased.

In describing the invention in detail, reference will be had to the accompanying drawings wherein like characters of reference designate like or corresponding parts throughout the several views, of which—

Fig. 3 is a front elevation of the main supporting surface illustrating one of the auxiliary supporting surfaces folded thereupon and in section;

Fig. 4 is a similar view illustrating said auxiliary supporting surface extended and in section;

Fig. 5 is a transverse horizontal section on the line 5—5 of Fig. 4;

Figure 1:
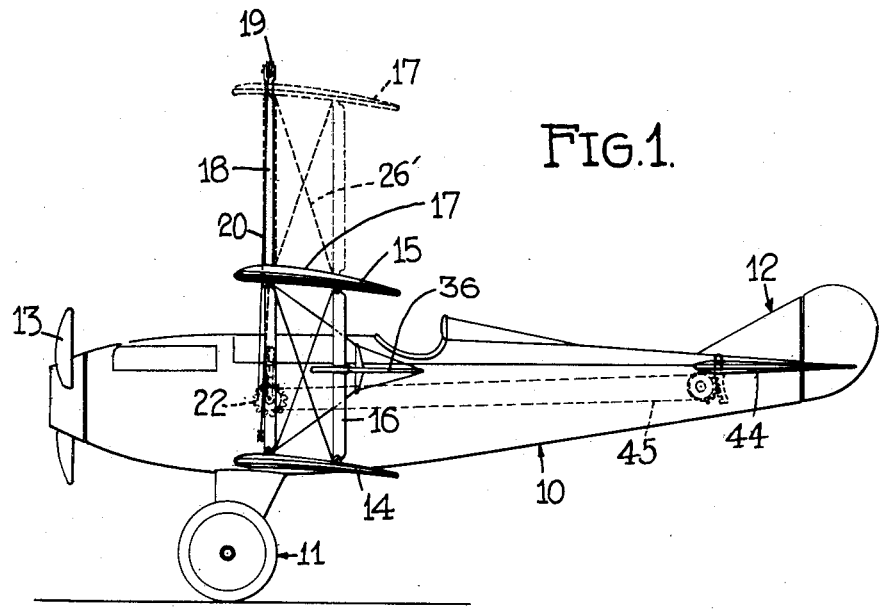
Figure 1 is a side elevation of an aeroplane equipped with collapsible or foldable auxiliary supporting surfaces.
Figure 2:
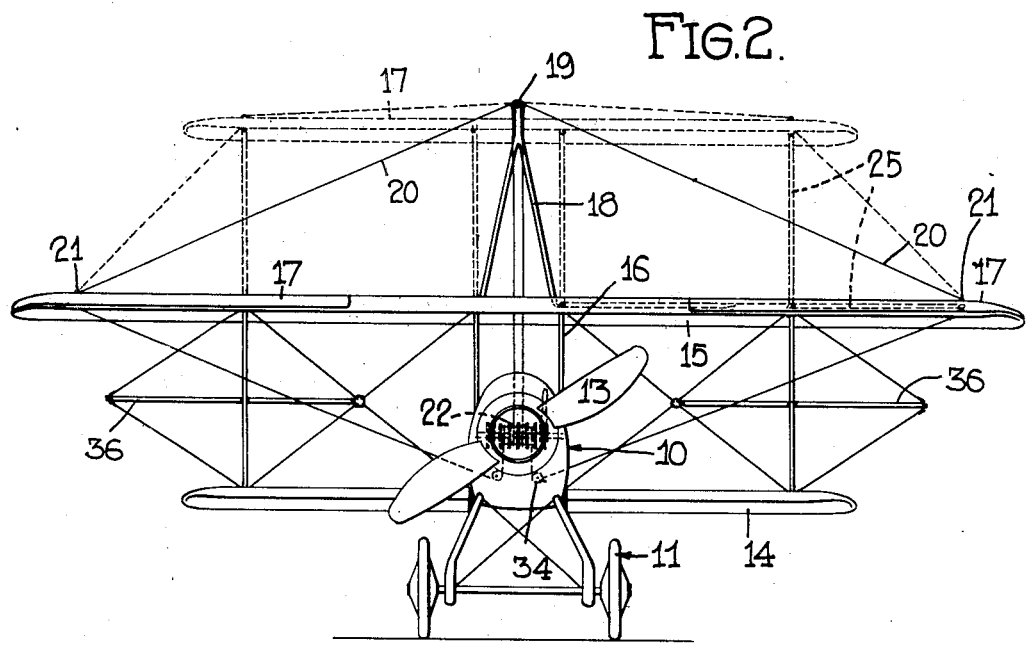
Fig. 2 is a front end elevation of the craft.

For the purpose of exemplifying the application of the present invention, the aeroplane illustrated in Figs. 1 and 2 may be generally described as comprising a fuselage or body 10, landing gear 11, empennage 12, tractor propeller 13 and superposed supporting surfaces 14 and 15 respectively. While of the biplane type, it is to be understood that the invention may be equally as well employed in connection with monoplanes, triplanes and multiplanes. In each instance, the result is identical.

Wing posts 16 interconnect the supporting surfaces of the craft respectively at the fuselage and at opposite sides thereof. The lower supporting surface 14 is of the usual aerofoil construction, although in the present showing its span is considerably less than the span of the upper or main supporting surface 15. Said main supporting surface, above the engine section of the fuselage and throughout a portion of its span at each side of said engine section, is characterized by thickness greater than the thickness throughout the remaining portions of its length. The reduced or terminal portions of said surface 15 have a thickness which, combined with the thickness of the auxiliary supporting surfaces 17 equal the thickness of said surface 15 at its engine section. Said auxiliary surfaces 17 normally lying contiguous to the main supporting surface collectively present an aerofoil of uniform thickness substantially from tip to tip and of sectional form deemed most desirable. In length, the auxiliary surfaces equal the length of the reduced portions of the main supporting surface to snugly engage therein.

Directly over the engine section panel of the main supporting surface a standard 18 is erected, the legs of the standard being arranged to continue the center wing posts 16 beyond the main supporting surface in converging relation as shown. At the apex end of the standard 18, a sheave or pulley 19 is provided. Over this sheave or pulley 19 operating cords 20 for the respective auxiliary planes 17 are trained. These operating cords are terminally fastened at one end as indicated at 21 to said auxiliary planes 17 to provide for movement of the said planes when desired, from the position indicated in Fig. 3 to the position indicated in Fig. 4. At their opposite ends the cords 20 extend into the fuselage or body of the craft for attachment to a drum 22 operable manually to move said auxiliary surfaces simultaneously either into or out of operative or lifting position.

Figure 6:
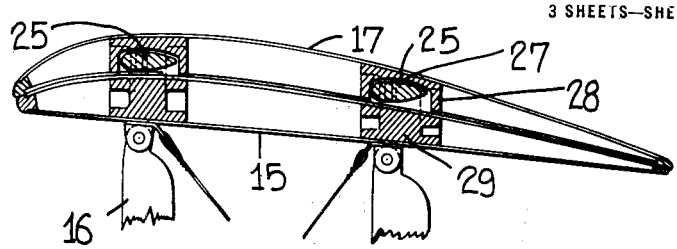
Fig. 6 is an enlarged section on the line 6—6 of Fig. 3.

The relatively thick portion of the upper supporting surface is longitudinally grooved as indicated at 23 and cross grooved as indicated at 24 to receive, in the folded or collapsed position of the auxiliary supporting surfaces, the posts 25 and wires 26' respectively. Said posts 25 are terminally pivoted as indicated at 26 to the main supporting surface and to the auxiliary supporting surfaces in the vertical plane of the respective wing posts 16. The auxiliary supporting surfaces are also longitudinally grooved as indicated at 27 to receive the posts 25 and accordingly permit complete folding of said auxiliary wings upon the main supporting surface. The grooves 27 in the auxiliary surfaces are formed by channeling the wing beams 28 throughout a portion of their length. The wing beams 29 of the main supporting surface are of uniform cross section (see Fig. 6) and of a thickness equaling the thickness of the said surface at its reduced terminals. By this arrangement the grooved portions of said surface in no way structurally weaken said beams.

Mutual support of bracing of the auxiliary planes is secured by reason of their abutting relation when extended. Both planes swing outwardly or away from the center longitudinal axis of the craft to uniformly balance the fixed surface when folded. Such characteristics make for simplicity, symmetry and strength.

As a means for collapsing or folding the auxiliary surfaces, operating cords 30 are provided. These cords are fastened to the under surface of each auxiliary plane as indicated at 31, to extend through openings 32 formed in the main plane and thence inwardly for attachment to the drum 22. Pulleys or sheaves 33 and 34 located respectively in proximity to the openings 32 and interiorly of the fuselage, guide the cords 30 into controlling movement of said planes. Any suitable operating device such as the pawl and ratchet mechanism illustrated in Fig. 1 may be utilized in connection with the drum 22 for raising and lowering the auxiliary surfaces. Both the drum and its operating mechanism are disclosed for purposes of exemplification only.

Said auxiliary surfaces 17 are particularly useful in starting and alighting because of the increased supporting area obtainable. This increased supporting area, in alighting, provides for a greater gliding angle and consequently a better landing at reduced speed. After ascending or gaining the altitude desired, the speed of the craft may be considerably increased without decreasing the angle of incidence of the supporting surfaces by collapsing the auxiliary planes or converting the machine into a biplane. This conversion, although decreasing the lifting efficiency, increases the flying efficiency in that the head resistance is reduced and greater speed provided without increasing the propelling power or lightening the machine. A reduction of the lifting efficiency is entirely practical in traveling at speed. Moreover, said auxiliary surfaces are advantageous in that a rapid climb is obtainable during flight by temporarily utilizing the auxiliary planes.

The speed with which the auxiliary planes may be extended is entirely under the control of the operator from the fuselage or body of the craft. The action of air upon the under surface of said planes, during flight, is sufficient to extend said planes without the aid of the pawl and ratchet mechanism. Said mechanism or its equivalent is, however, essential in returning said planes to normal collapsed position.

Figure 7:
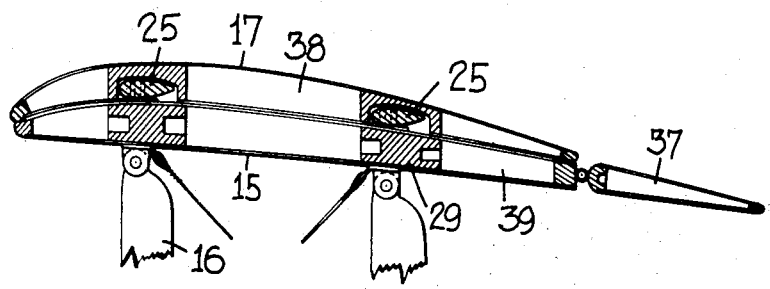
Fig. 7 is a sectional view similar to the section of Fig. 6 illustrating a modification.

The ailerons, designated 36, it will be noted are disposed intermediate the supporting surfaces 14 and 15. This disposition of the ailerons intermediate said surfaces avoids necessitating a special form of auxiliary planes. In Fig. 7, however, the ailerons 37 of the modification disclosed are of the trailing edge type. The auxiliary surfaces 38 terminate abruptly, in said modification, in line with the trailing edge of the main supporting surfaces, 39. In other respects the wing structure is substantially as in the preferred types of wing.

Although I have described more or less precise form and details of construction, I do not intend to be understood as limiting myself thereto. Obviously, the auxiliary surfaces may be arranged intermediate the planes of a biplane or multiplane or below the fixed plane of a monoplane, or if desired, said auxiliary planes, may be produced beyond the fixed surface terminals for inward folding movement or folded inwardly and toward each other. These and similar changes, together with changes in form, proportion and the substitution of equivalents, are to be made, as circumstances may suggest, without departing from the spirit of the invention as claimed.

Figure 8:
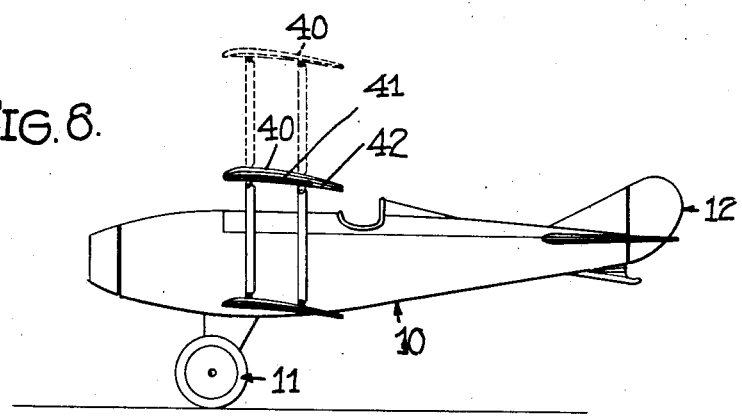
Fig. 8 is a side elevation of a modified wing arrangement.
Figure 9:
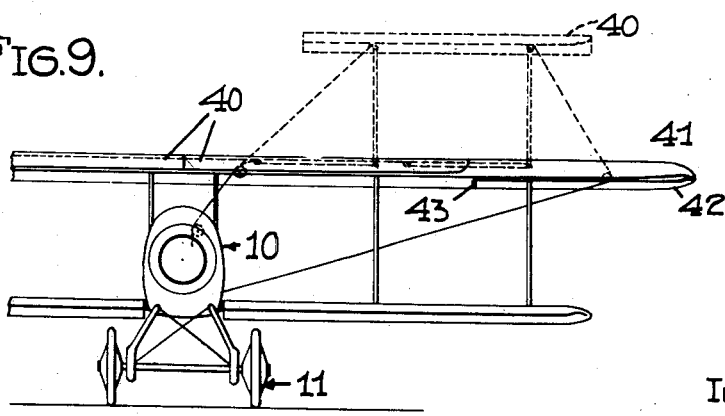
Fig. 9 is a half front elevation of the machine illustrated in Fig. 8.

The manner in which the auxiliary surfaces are arranged for inward folding movement is illustrated in Figs. 8 and 9. In this modification the aeroplane construction is substantially the same as the construction disclosed in connection with the preferred form of machine. The auxiliary surfaces, designated 40, when collapsed or folded, abut at their inner ends. When extended, said surfaces 40 are separated and overhang the wing tips of the main supporting surfaces 41. By this arrangement, the usual type of aileron (herein designated 42) may be provided since sufficient area is provided at the wing tips of the main plane to permit of the formation of the usual jog 43 even though the auxiliary surfaces 40 be folded and of a chord length or wing depth coextensive with that of the plane 41. The operating cables for the surfaces 40 are appropriately arranged in view of the different wing arrangement. In other respects, the modified wing arrangement is identical with that of the preferred type, hinged or pivoted wing posts, grooves, etc. being provided. This modification merely shows the adaptation of auxiliary planes in connection with a machine equipped with the conventional type of ailerons.

To overcome any disturbance of the longitudinal balance of the machine due to the increased resistance when the auxiliary surface is extended, the horizontal stabilizer 44, normally neutral, is made adjustable. Preferably it is connected up with the control mechanism 22 for the auxiliary supporting surface for adjustment simultaneously with the movement of said surface into and out of its extended or effective position. As said auxiliary surface is extended the angle of incidence of the horizontal stabilizer is varied to positive as at a positive angle it exerts sufficient lift to counter-act the resistance or drag of the extended auxiliary surface 17. Should the horizontal stabilizer normally have a slight positive angle of incidence or a slight negative angle of incidence then its movement or adjustment to counter-act resistance of the auxiliary supporting surface would be relative, that is, from a negative angle to a lesser negative angle or to a positive angle or when normally positive to an angle still more positive. The connection between the control mechanism 22 and the horizontal stabilizer is designated as 45.

What is claimed is:

1. An airplane including two supporting surfaces, one of the supporting surfaces being movable into position respectively superimposed upon and superposed with respect to the other, the movable supporting surface comprising separate wings movable toward and away from each other, toward each other as the supporting surfaces are moved into superposed position and away from each other as the supporting surfaces are moved into superimposed position, said wings abutting when the supporting surfaces are superposed whereby to provide a supporting surface continuous from tip to tip.

2. An airplane including two supporting surfaces, one of the supporting surfaces being movable into positions respectively superimposed upon and superposed with respect to the other, the movable supporting surface comprising separate wings movable toward and away from each other, toward each other as the supporting surfaces are moved into superposed position and away from each other as the supporting surfaces are moved into superimposed position, said wings abutting when the supporting surfaces are superposed whereby to provide a supporting surface continuous from tip to tip, and when superimposed, being so related to the supporting surface upon which they rest that the supporting surfaces together constitute but one supporting surface of substantially constant cross section throughout.

3. An airplane including two supporting surfaces of unequal span, the wings of one of said supporting surfaces being movable bodily laterally into positions respectively superimposed and superposed with respect to the other, the supporting surfaces when superposed being continuous from tip to tip and when superimposed being so related that they together constitute but one supporting surface of substantially constant cross section throughout.

4. An airplane including a fixed supporting surface and an auxiliary supporting surface, the auxiliary supporting surface comprising separate wings movable laterally outwardly toward and inwardly away from the fixed supporting surface, the supporting surfaces in one position being superimposed and in another position being superposed, said supporting surfaces when superposed being of unequal span, and when superimposed being so related that they together constitute but one supporting surface of substantially constant cross section throughout.

5. An airplane including a fixed supporting surface of reduced thickness throughout a portion of its length together with a supporting surface movable into positions respectively superimposed upon and superposed above the first mentioned supporting surface, the second mentioned supporting surface comprises separate wings, the span of the wings being such that they, the wings, lie flat against that portion of the supporting surface reduced in thickness when the supporting surfaces are superimposed, said wings, when the supporting surfaces are superposed, abutting to provide a supporting surface continuous from tip to tip.

6. An airplane including a supporting surface provided with grooves, a supporting surface foldable upon the grooved supporting surface, and wing posts connecting the two supporting surfaces, the arrangements of the wing posts being such that they lie in the grooves when the supporting surfaces are folded.

7. An airplane including a supporting surface provided with grooves, a supporting surface foldable upon the first mentioned supporting surface, and wires connecting the two supporting surfaces, the arrangement of the wires being such that they lie in the grooves when the supporting surfaces are folded.

8. An airplane including a supporting surface provided with grooves, a supporting surface foldable upon the grooved supporting surface, wing posts connecting the two supporting surfaces, and wires likewise connecting the two supporting surfaces, the arrangement of the wing posts and the wires being such that they lie in the grooves when the supporting surfaces are folded.

9. An airplane including a supporting surface provided with grooves, a supporting surface comprising separate wings foldable laterally upon the grooved supporting surface, and connections between the two supporting surfaces, the arrangement of the connections being such that they lie in the grooves when the wings are in folded position.

10. An airplane including a supporting surface, reduced in thickness throughout a portion of its length, the remaining portion of its length being provided with grooves, a supporting surface foldable upon that portion of the first mentioned supporting surface reduced in thickness, and connections between the two supporting surfaces, the arrangement of the connections being such that they lie in the grooves when the supporting surfaces are folded.

11. An airplane including a fixed supporting surface having a portion of its area of substantially greater thickness than the remaining portion thereof, an auxiliary supporting surface movable relatively to the fixed supporting surface, the auxiliary supporting surface comprising separate wing panels movable bodily laterally from an extended position in abutting engagement one with the other to a collapsed position in which the adjacent ends of the wing panels are widely spaced, the thickness of the auxiliary surface being such that its thickness together with the thickness of the relatively thin portion of the fixed supporting surface is substantially equal to the thickness of the relatively thick portion of the fixed supporting surface, said fixed supporting surface and said auxiliary supporting surface, together constituting, in the collapsed position of said auxiliary supporting surface, a supporting surface of substantially uniform thickness throughout.

12. In an airplane, the combination with the horizontal stabilizer, of a principal supporting surface, an auxiliary supporting surface movable from a collapsed position superimposed upon to an extended position superposed above the principal supporting surface, and mechanism for varying the angle of incidence of the horizontal stabilizer simultaneously with the extension of said auxiliary supporting surface whereby the resistance which the extended auxiliary supporting surface offers is to some extent counteracted without disturbing the longitudinal balance of the machine.

13. In an airplane, the combination with the horizontal stabilizer, of a principal supporting surface, an auxiliary supporting surface movable relatively to the principal supporting surface from a collapsed to an extended position, and means connected with the horizontal stabilizer to vary its angle of incidence simultaneously with the adjustment of the auxiliary supporting surface, the angle of incidence of the horizontal stabilizer being variable to counteract the difference in the resistance which the auxiliary supporting surface offers according to whether it is extended or collapsed.

In testimony whereof I hereunto affix my signature.

JOHN P. TARBOX.